(12) United States Patent
Anisimov et al.

(10) Patent No.: US 6,449,358 B1
(45) Date of Patent: Sep. 10, 2002

(54) METHOD FOR PREDICTING AND MANAGING CALL LOAD BY DETERMINING THE OPTIMUM FREQUENCY OF OUTBOUND CALL GENERATION DURING AN OUT-BOUND CALLING CAMPAIGN FROM A CALL CENTER

(75) Inventors: Nikolay Anisimov, Walnut Creek; Konstatin Kishinsky, San Carlos; Niolay Korolev, Walnut Creek; Gregory Pogossiants, Palo Alto; Yuri Shtivelman; Vadim Zyarko, both of San Francisco, all of CA (US)

(73) Assignee: Genesys Telecommunications Laboratories, Inc., San Francisco, CA (US)

( * ) Notice: Subject to any disclaimer, the term of this patent is extended or adjusted under 35 U.S.C. 154(b) by 0 days.

(21) Appl. No.: 09/550,006

(22) Filed: Apr. 14, 2000

Related U.S. Application Data

(63) Continuation-in-part of application No. 09/209,306, filed on Dec. 11, 1998, which is a continuation-in-part of application No. 09/024,825, filed on Feb. 17, 1998, now Pat. No. 6,044,146.

(51) Int. Cl.[7] .................................................. H04M 3/00
(52) U.S. Cl. ............................ 379/266.07; 379/266.08; 379/309
(58) Field of Search ........................... 379/34, 215–216, 379/242, 265–266, 268–269, 272, 308–309, 904, 88.09, 266.08, 266.07

(56) References Cited

U.S. PATENT DOCUMENTS

| | | | | |
|---|---|---|---|---|
| 5,214,688 A | * | 5/1993 | Szlam et al. | 379/266.08 |
| 5,247,569 A | * | 9/1993 | Cave | 379/266.08 |
| 5,519,773 A | * | 5/1996 | Dumas et al. | 379/266.07 |
| 5,815,566 A | * | 9/1998 | Ramot et al. | 379/266.07 |
| RE36,416 E | * | 11/1999 | Szlam et al. | 379/88.09 |
| 6,389,133 B1 | * | 5/2002 | Kamen | 379/266.08 |

* cited by examiner

*Primary Examiner*—Wellington Chin
*Assistant Examiner*—Maikhanh Tran
(74) *Attorney, Agent, or Firm*—Donald R. Boys; Central Coast Patent Agency, Inc.

(57) ABSTRACT

A system for balancing outbound dialing rate with agent utilization in a telephony call center, minimizing wait time for answered outdialed calls has a call number generating module for generating numbers to be automatically dialed, a dialing unit for dialing numbers generated, a queue for queing answered calls, and a stat module for monitoring performance and generating a call generation rate. The system uses an analytical method in one embodiment for determining the call generation rate, wherein the method uses one or more of distribution function of system processes, numerical methods, solving of non-linear equations, or probability techniques. In another embodiment the system accomplishes the same purpose using a simulation method for determining the call generation rate, wherein parameters relating to a queing system are estimated in absence of sufficient information by simulating each of the system's processes, predicting behavior of the system on basis of previous experience, and finding optimal point in future to make a next call.

2 Claims, 8 Drawing Sheets

Fig. 3 Skill-Based Priority

Communication Center (Out-Bound Campaign)

METHOD FOR PREDICTING AND MANAGING CALL LOAD BY DETERMINING THE OPTIMUM FREQUENCY OF OUTBOUND CALL GENERATION DURING AN OUT-BOUND CALLING CAMPAIGN FROM A CALL CENTER

CROSS-REFERENCE TO RELATED DOCUMENTS

The present invention is a continuation in part of application Ser. No. 09/209,306 now U.S. Pat. No. 6,157,655 entitled "Method for Estimating Telephony System-Queue Waiting Time in an Agent Level Routing Environment" filed on Dec. 11, 1998 disclosure of which is incorporated herein by reference, which is a continuation-in-part of application Ser. No. 09/024,825, filed Feb. 17, 1998, now U.S. Pat. No. 6,044,146.

FIELD OF THE INVENTION

The present invention is in the field of Computer Telephony Integrated (CTI) communication systems including both connection-oriented, switched telephony (COST) systems and Data Network Telephony (DNT) systems such as Internet-Protocol-Network-Telephony (IPNT) systems, and pertains more particularly to methods and apparatus for predicting an optimum frequency for an out-bound call generator in skill-based agent level routing (ALR) environments.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may tend to obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large enterprises, such as insurance companies and the like. In some cases enterprises develop and maintain their own telephony operations with purchased or leased equipment, and in many other cases, companies outsource such operations to firms that specialize in such services.

In a call center, a relatively large number of agents handle telephone communication with callers. Each agent is typically assigned to a telephone connected to a central switch, such as a PBX, which is in turn connected to a public-switched telephone network (PSTN), well-known in the art. The central switch may be one of several known types.

An organization having one or more call centers for serving customers typically provides one or more telephone numbers to the public or to their customer base, or both, that may be used to reach the service. These numbers are frequently of the no-charge-to-calling-party variety. The number or numbers may be published on product packaging, in advertisements, in user manuals, in computerized help files, and the like. There are basically two scenarios. If the organization providing the service has a single call center, the number may be to the call center, and all further routing to an agent will be at the call center. If there are several call centers, the organization may provide several numbers, one for each call center, and the customer may be expected to use the number for the closest center, or for the center advertised to provide specifically the service he or she might need. In many cases the number provided will connect the caller with a first Service Control Point (SCP) which is adapted to pre-process incoming calls and forward the calls to call centers.

Routing of calls, then, may be on several levels. Pre-routing may be done at SCPs and further routing may be, and often is, accomplished at individual call centers. As described above, a call center typically involves a central switch, typically including an Automatic Call Distributor (ACD). The central switch is connected to the PSTN or other call network, as is well-known in the art. Agents, trained to interact with callers, service telephones connected to the central switch.

If the call center consists of just a central switch and connected telephone stations, the routing that can be done is quite limited. Current art telephony switches, although increasingly computerized, are limited in the range of computer processes that may be performed. For this reason additional computer capability in the art has been added for such central switches by connecting computer processors, adapted to run control routines and to access databases, to the central switch. The processes of incorporating computer enhancement to telephone switches is known in the art as Computer Telephony Integration (CTI), and the hardware and software together is referred to as CTI equipment. Typically the CTI processor, executing CTI applications, monitors the activity of the switch and status of calls and equipment, and issues instructions and commands to the switch.

In a CTI system, telephone stations having telephones connected to the central switch may be equipped also with computer terminals, so agents manning such stations may have access to stored data as well as being linked to incoming callers by a telephone connection. Such stations may be interconnected in a local area network (LAN) by any one of several known network protocols, with one or more servers also connected to the network, and the CTI processor connected on the network as well.

When a call arrives at a call center, whether or no the call has been pre-processed at a SCP, typically at least the telephone number of the calling line is made available to the receiving switch at the call center by a telephone carrier. This service is available by most PSTNs as caller-ID information in a format such as the well-known ANIS system (Automatic Number Identification System). If the call center is computer-enhanced (CTI), the phone number of the calling party may be used to access additional information from a database at a server on the network that connects the agent workstations. In this manner information pertinent to a call may be provided to an agent.

Even with present levels of CTI there are still problems in operating such call centers, or a system of such call centers. For example there are waiting queues with which to contend, and long waits may be experienced by some callers, while other agents may be available who could handle callers stuck in call-center queues. This condition is usually more prevalent in a large call-in center wherein a limited number of agents must field many calls. It is generally desired that waiting periods experienced by callers not be of such a length such that a caller becomes frustrated and terminates the call. However, it is witnessed by many who patronize call centers that much improvement is needed with regards to waiting time in call-center queues.

There are techniques practiced in the industry aimed at alleviating long caller-queue waiting periods. One such standard development involves call load-balancing wherein incoming calls are distributed (routed) more evenly to available call centers such that queue lengths individual to separate call centers are somewhat the same. This technique may also be practiced in single call centers wherein calls are distributed among separate groups of agents. While this technique helps to even out call loads among different queues, queue length may still be high during peak traffic periods.

Another technique involves transferring a call to an alternate destination when that call approaches a pre-set maximum queue-waiting time for an agent. The alternate destination may help to keep the caller on the line via interactive method such as reviewing the purpose of the call or perhaps advertising products, while waiting for an available agent. However, a long queue can still be an irritating factor for many callers, even when some form of entertainment such as music is provided.

The above-described techniques may help to stabilize overall queue waiting times within call centers, or help to alleviate caller stress when waiting time is excessive, but they only partially address the problem. At peak call-in periods queue waits may still be high even though calls are distributed evenly. Regardless of the distribution (routing) method used, callers are generally not informed of expected waiting time.

With advances in call routing becoming more prevalent in the art advanced techniques must be developed for estimating queue wait times. New technologies include priority queuing, virtual queuing, routing to agents based on skill-set of the agent (e.g. language, level of expertise, etc.), routing to agents based on level or state of availability, routing to agents based on pre-acquired and/or pre-stored caller information, routing to agents based on priority assignment of call, and so on.

In addition to priority queuing, virtual queuing, as mentioned above, is also implemented in CTI-enhanced environments. A virtual queue is a method for tokenizing a call wherein the caller may retain his position be it FIFO or priority queue after he has terminated the call. When his position is the next "call" to be handled, an automated or manual outbound dialer places a call to the original caller. When the caller answers, he is connected to the available agent chosen to handle the call.

In a system known to the inventor and listed by title under the cross-reference section, call-waiting time may be estimated for selected calls waiting in selected queues using a number of calculative techniques depending at least in part on the queuing arrangement. The system, takes into account such conditions as rate of abandoned calls, multiple queues, average call-length statistics, bumped calls (Priority), redirected calls, and so on. Callers are periodically informed of estimated wait time (EWT) by an IVR system while they wait for an agent to address their needs. Due to the calculative and predictive nature of the system technique and the availability of variable information to the system obtained through compilation of data from statistical sources within the call center, higher accuracy in predicting actual wait time is attained at higher call loads.

It is generally true that callers who are calling in to a call center for the express purpose of contacting an agent are more likely to agree to some waiting period than customers who are contacted by the call center as part of an out-bound customer care campaign. For example, an out-bound call campaign uses a call generator and an out-bound dialing system for automated call-and-connect to available agents waiting for the calls. As such, calls resulting from the out-bound technique are routed to agents in the same fashion as normal incoming traffic.

In this scenario, there are further problems with which to contend in order to effect adequate call-load to agent utilization ratios. For example, there are missed calls due to non-answer. There will invariably be customer pick-ups that simply hang-up immediately. There will also be calls answered by an answering machine. Therefore, out of a total number of out-bound call attempts, only a certain percentage will translate into calls-in-queue.

The calls-in-queue resulting from an out-bound campaign must be treated differently than normal incoming calls because of the fact that a customer that has been called by the center is much less likely to accept even a small wait time in queue. Therefore, it is desired that there be zero or near zero wait time for connecting out-bound contacts to waiting agents.

The challenge then, is how to manage a call-load resulting from an out-bound campaign such that customers are not kept waiting for any long period, and that agents are still not underutilized in answering calls.

What is clearly needed is a method for predicting call generation rates in an out-bound-call campaign such that the appropriate call-loads are produced for the appropriate number of agents working the calls with customers experiencing very little or no wait time. A system such as this would allow a higher success rate in servicing customers contacted through out-bound call campaigns by enabling agents to retain those contacts normally lost because of hang-up during queue wait time.

SUMMARY OF THE INVENTION

In a preferred embodiment of the invention a system for balancing outbound dialing rate with agent utilization in a telephony call center, minimizing wait time for answered outdialed calls is provided, comprising a call number generating module for generating numbers to be automatically dialed; a dialing unit for dialing numbers generated; a queue for queing answered calls; and a stat module for monitoring performance and generating a call generation rate. The system uses an analytical method for determining the call generation rate, wherein the method uses one or more of distribution function of system processes, numerical methods, solving of non-linear equations, or probability techniques.

In another aspect an analytical method for minimizing time in queue for parties answering outdialed calls is provided, comprising steps of (a) monitoring elements of system behavior using a stat module connected to a call generating unit; (b) calculating a call generation rate by applying one or more of distribution function of system processes, numerical methods, solving of non-linear equations, or probability techniques with statistics developed by the stat module; and (c) applying the call generation rate to pace the call generation unit.

In yet another aspect a system for balancing outbound dialing rate with agent utilization in a telephony call center, minimizing wait time for answered outdialed calls is provided, comprising a call number generating module for generating numbers to be automatically dialed; a dialing unit for dialing numbers generated; a queue for queing answered calls; and a stat module for monitoring performance and generating a call generation rate. This system uses a simulation method for determining the call generation rate, wherein parameters relating to a queing system are estimated in absence of sufficient information by simulating each of the system's processes, predicting behavior of the system on basis of previous experience, and finding optimal point in future to make a next call.

In still another aspect a simulation method for minimizing time in queue for parties answering outdialed calls, in an outdialing system is provided comprising steps of (a) simulating each of the system's processes; (b) predicting behavior of the system on basis of previous experience; and (c) finding an optimal point in the future to make a next call, based on results of steps (a) and (b).

In embodiments of the system taught in enabling detail below an outdialing system is provided that performs better than prior art systems, minimizing time in queue for answered calls.

BRIEF DESCRIPTION OF THE DRAWINGS FIGURES

DESCRIPTION OF THE PREFERRED EMBODIMENTS

Figure 1:
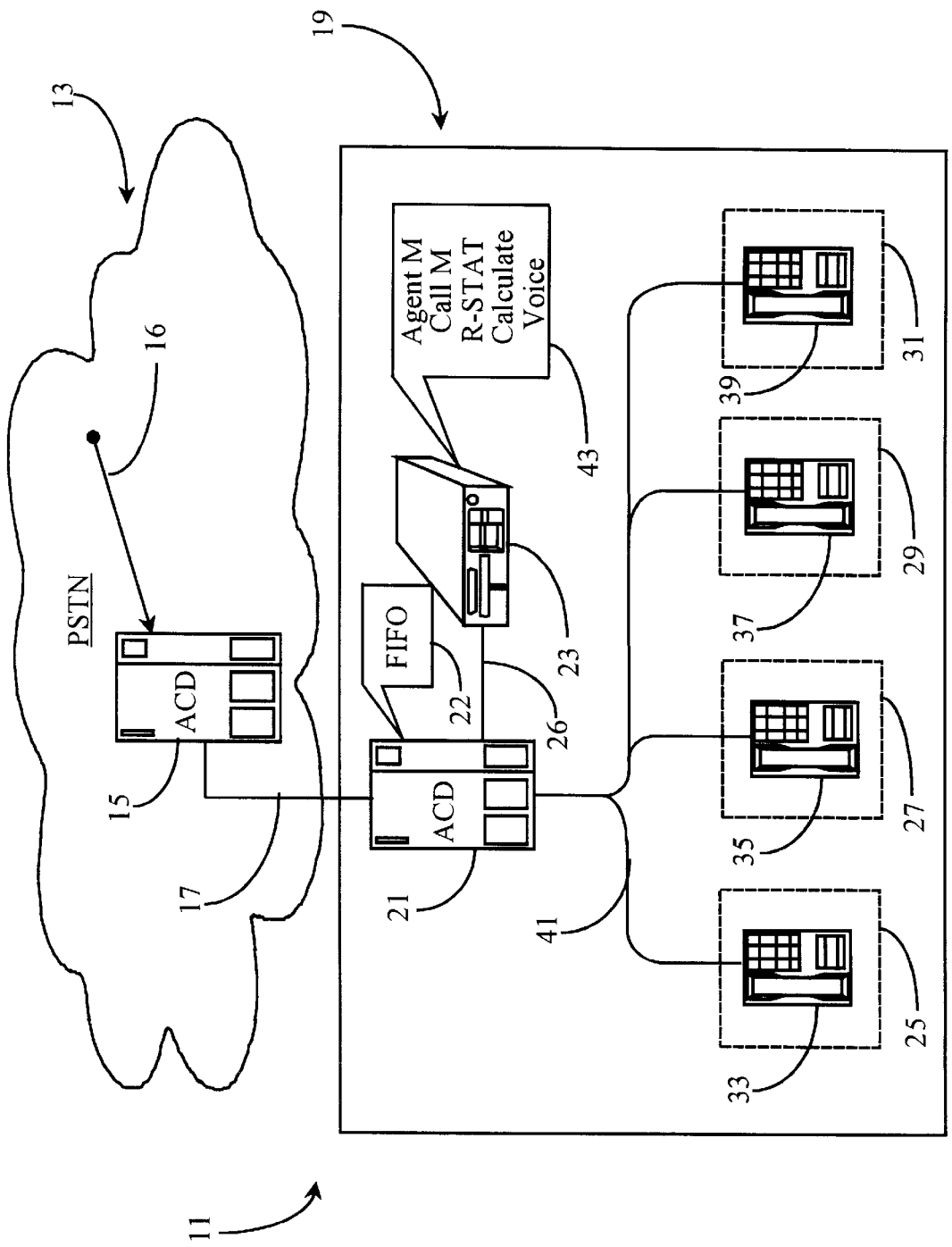
FIG. 1 is a block diagram illustrating a communication system having call-waiting estimation capability according to prior art.

FIG. 1 is a block diagram illustrating a communication system 11 wherein calculation of estimated waiting time (EWT) is practiced according to the prior art. As previously mentioned in the background section, prior art attempts to estimate call waiting time in call-center queues is rather limited in scope. The prior art approach cited in U.S. Pat. No. 5,020,095 assumes a limited hardware-fix that is applicable only for an ACD system wherein strict FIFO queuing is practiced. To further illustrate limitation in this approach, a prior art overview is illustrated below.

Communication system 11 comprises a PSTN 13 and a call-in center 19. System 11 uses the well-known ACD-type telephony switching common to a COST network. For example, PSTN 13 has an ACD switch 15 connected therein and adapted to receive incoming calls represented by a vector 16 from anywhere in PSTN 13. ACD 15 is connected to an ACD central switch 21 within call-in center 19 via telephony trunk 17. ACD 21 is adapted as a central call-in switch and is a first destination for all calls 16 destined to call-in center 19.

As is known in the art, ACD 21 employs a FIFO queuing system 22 wherein calls 16 wait until an available representative is available to handle the call on a first-in first-out basis. ACD 21 is connected via an internal wiring system 41 to a plurality of telephones 33, 35, 37, and 39 which are implemented one-telephone-per to agent workstations 25, 27, 29, and 31. Call-in center 19 is not CTI enhanced to the extent that agents at workstations 25–31 have access to LAN connected PC's nor is call-in center 19 capable of much intelligent routing such as is possible in CTI enhanced environments. It is to this simple prior art system that EWT is implemented in rather limited scope as described above.

In order to achieve EWT in this prior art system, a call processor 23 is provided as a dedicated unit for estimating waiting time associated with FIFO queue 22. Processor 23 is connected to ACD 21 via a data control line 26. In prior art specification 5,020,095 which was mentioned above with reference to the background section, incoming trunks 17 are diverted through such a processor as processor 23 lending to the dedicated nature of the device as disclosed therein. However, it will be apparent to one with skill in the art that the same level of control over ACD 21 may be provided via control line 26 with the appropriate trunk interfaces installed in ACD 21. Processor 23 would not be considered a CTI processor in current art as intelligent routing applications are not incorporated therein.

Several EWT software routines are provided and installed in processor 23 and adapted, among other purposes, for monitoring and interfacing with calls 16 as they arrive in queue 22. Other capabilities include agent monitoring for busy or not busy, voice interface capability for informing callers of EWT, a means for calculating average call time per call, a means for counting calls ahead in queue 22, and a means for estimating EWT based on real-time averages obtained from most recent call-length statistics. Optional facilities (not shown) that may be connected to an ACD such as ACD 21 include a standard voice messaging facility, and one or more live operator attendants.

In operation of prior art system 11, incoming calls 16 arrive at ACD 15 in network 13 and are distributed over incoming trunk 17 to ACD 21 where they are queued (22) in the order that they arrive. Calls 16 are treated according to a pre-set queue limit, wherein once reached, a next caller is optionally informed via recorded message that the queue is full and offered another destination. The alternate option is to simply disconnect the call. Only if queue 22 is functioning below a pre-set limit is EWT practiced wherein a caller my be optionally informed of an estimated waiting time via one of a plurality of stored pre-recorded messages that is most closely associated with the current estimate which is based on the average time of the prior three completed calls.

The method and apparatus of this prior art example is inflexible with regards to other states that may exist. For example, a simplistic mathematical formula may be adopted to reflect this prior art example. The formula:

$$EWT=(N \times T_h)/m$$

N is the total calls in queue 22, $T_h$ is the average time handling each call, and m is the total sum of agents handling calls from queue 22. This formula, which can be considered a basic formula, would apply in this example. One limitation with this formula, as it applies to this case, is that it does not consider abandoned calls, unless such abandoned calls are figured in abandoned cal time, which is seldom the case. A time estimate over three prior calls may include one or more abandoned calls thereby producing an unnaturally low average call-handling time that is communicated to the next caller arriving in queue. Moreover, EWT as communicated to a caller must take into account the number of calls ahead of his or her call in queue or N (total calls in queue). If there are many calls ahead multiplied by an unnaturally low average call handling time, the caller may receive a misleading time estimate.

Another problem with prior art as exemplified herein is that the actual time for handling calls may vary widely from call to call. Therefore, taking an average handling time over just a few calls (three in U.S. Pat. No. 5,020,095) is not reflective of a confident average as it is well known that accuracy of any average taken improves with the number of units (in this case calls) to be averaged. Still another state that is not considered in the prior art is the fact that agents in many cases may receive calls from more than one queue. Therefore, simply summing up the number of agents (m) working from one queue will not suffice as a portion of their time may be devoted to answering calls from another queue. Therefore, a more flexible treatment of EWT must be accomplished by way of revised formulas and added software in order to successfully and more accurately practice EWT. Such a flexible implementation of EWT is described in enabling detail below.

Figure 2:
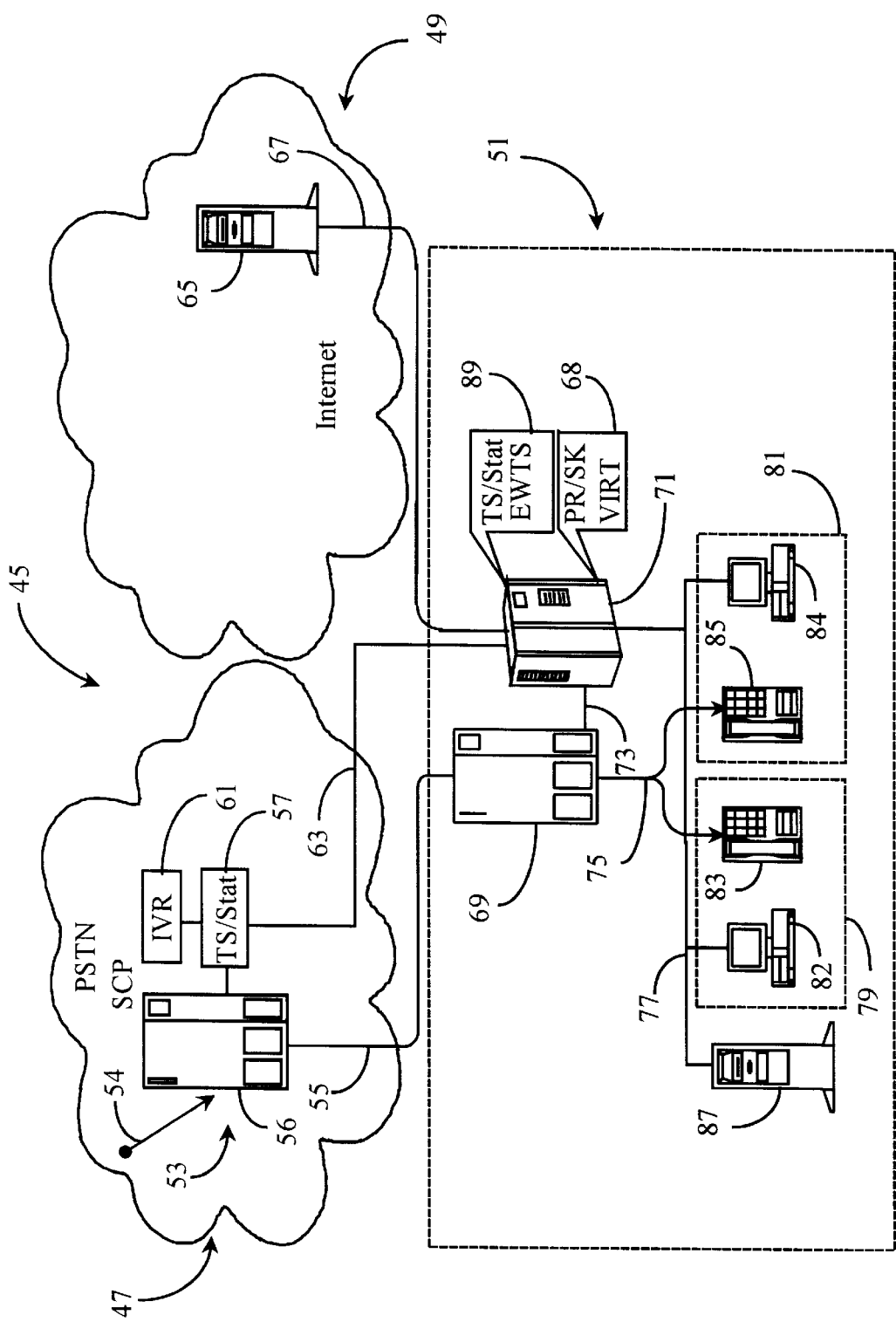
FIG. 2 is an overview of a CTI-enhanced telecommunications system wherein estimated-waiting time (EWT) may be practiced according to an embodiment of the present invention.

FIG. 2 is an overview of a CTI-enhanced telecommunications system 45 wherein EWT may be practiced according to an embodiment of the present invention. System 45 in this example comprises a PSTN network 47, an Internet network 49, and a communication center 51. PSTN 47 may be a public or private COST network as is known in the art. Internet 49 may be of the form of another data-packet network as is known in the art such as a private WAN or corporate Intranet. Communication center 51, in this embodiment, is capable of receiving incoming calls from both PSTN 47 and Internet 49, however, this is not required in order to practice the present invention.

A Service Control Point (SCP) 53, including a switching apparatus 56, is provided in PSTN 47 and adapted to receive incoming calls represented by vector 54 arriving from anywhere in PSTN 47. SCP 53 may comprise any known type of telephony switch, including an ACD type switch. Also illustrated within PSTN 47 and related to the SCP is a CTI processor 57 and a connected intelligent peripheral 61 of the form of an interactive voice response (IVR) unit. IVR 61 is adapted to interface with callers on incoming calls 54 in order to obtain additional information for routing purposes.

The purpose of SCP 53 at the network level is so that intelligent routing may be performed in PSTN 47 before calls are in the domain of communication center 51. For example, when a call 54 is intercepted by SCP 53, IVR 61 may interact with the caller to obtain further detail regarding purpose of the call, destination desired, level of skill required to service this caller, and many other parameters such as may be asked a caller. A separate digital network 63 is provided and connects processor 57 to a processor 71 within communication center 51. In this way pertinate information about a caller may be sent ahead of the actual call. In some cases only things like DNIS and ANI are used.

SCP 53 is connected via a telephony trunk or trunks 55 to a central telephony switch 69 within communication center 51. Actual incoming calls are routed to switch 69 over trunk 55 while any information obtained via IVR 61 (or otherwise) is transferred over digital network 63 to processor 71. Central switch 69 may be an ACD-type or other known telephony switch. Processor 71 provides computer enhancement to switch 69 via CTI connection 73. Processor 71 may also provide enhancement to switch 53 at the network level via digital network 63, processor 57, and CTI connection 59. This embodiment represents state-of-the-art communication technology on the COST side of communication system 45 as is known and available to the inventor.

Internet 49 is meant to illustrate, for purposes of discussion, that the method and apparatus of the present invention may be adapted and equated to data-network-telephony (DNT), and more particularly Internet-protocol-network-telephony (IPNT) as would be practiced with regard to Internet 49 and communication center 51 in this embodiment. However, for the purpose of this specification, most reference will be to practice of the present invention in a COST network.

Within communication center 51, there is illustrated a plurality of agent stations, station 79 and station 81. Stations 79 and 81 are each adapted and equipped to facilitate a communication center agent's duties with regard to communication center 51. For example, station 79 has implemented therein a personal computer/video display unit (PC/VDU) 82 and an agent's telephone 83. Communication station 81 is likewise equipped with a PC/VDU 84 and an agent's telephone 85. Agent's telephones 83, and 85 are connected to switch 69 via internal wiring 75 as is known in the art. There may be many more agent stations than the two illustrated.

Communication stations 79 and 81 are interconnected via their PC/VDU's to a LAN 77 for the purpose of obtaining and sharing information through the course of normal communication-center operation. A customer information system (CIS) server 87 is connected to LAN 77 and provides a source of information regarding customers, products, services, and other like information. Processor 71 also is LAN connected.

It will be apparent to one with skill in the art that there will be many more communication stations such as station 79 operating in an actual communication center of the type described herein. However, the inventor deems two such illustrated stations and components therein sufficient for the purpose of adequately explaining the present invention. It will also be apparent to one with skill in the art that LAN connected PC/VDU's, such as PC/VDU 82 connected to LAN 77, are not required in order to practice the present invention, but merely provide a state-of-the-art example of implemented equipment that may be used in facilitating communication-center business.

Processor 71 has software 89 installed therein for accomplishing methods of the present invention in a most flexible manner. For example, instances of T-server and Stat-server (conventions known to the inventor) provide required routing intelligence and statistical intelligence according to enterprise rules. An instance of EWT software is, in a preferred embodiment, integrated with T-server and Stat-server routines such that automated selection and execution of appropriate routines may ensue in accordance with any prevailing enterprise rules including number and type of queues used, specific routing routines, and so on.

Software 89 may, in one embodiment, be provided as a single multifunction application. Several queuing options 68 are provided and adapted to meet varying needs according to the type of enterprise and business model preferred, or currently practiced within communication center 51. As previously described with reference to the background section, prior art is generally limited in application to a FIFO type ACD queue. The software of the present invention (89), however, may be practiced with any type of queuing arrangement including the use of multiple queues. In this way, an enterprise may be flexible in approach. For example, EWT's may be calculated and communicated to callers and used for other purposes regardless of what type of queue the calls are in, FIFO, Priority, Skill-based, Virtual, and so on.

It should be noted here that queues described wherein priority assignment, skill-based routing, agent status routing, and so on are instituted are still technically regarded as FIFO queues only in the sense that a progression is made with regards to calls coming in to queue and calls being answered from queue. The ability to stack queues and have calls advance according to various enterprise rules as disclosed with reference to co-pending application 09/024,825 would, of course, require more complex algorithms and statistical reporting in order to provide callers with a reasonably accurate EWT. Such capability is not available in prior art systems.

In order to accomplish accurate EWT in an intelligent routing environment such as system 45, the basic formula used for a simple FIFO ACD queue must be expanded, and better statistical handling and reporting must be observed as described above. In a preferred embodiment, statistical analysis and reporting of call behavior is provided via Stat-server shown as part of software 89. Stat-server software can be adapted to monitor and provide statistics regarding queues, switches, agent status, call traffic, and so on. This method is vastly superior over prior art. Statistical compilation capability may also be extended into PSTN 47 via digital network 63 and processor 57. Similarly, EWT and T-server capability may also be extended into PSTN 47 via the same conventions. In this way EWT may be provided at network level queues associated with SCP 53. More detail regarding expanded mathematical formulas and application thereof to various queue situations for practicing EWT is provided below. Also hierarchical systems can de assembled, where several call centers are connected to a network, and controlled by a common SCP.

Figure 3:
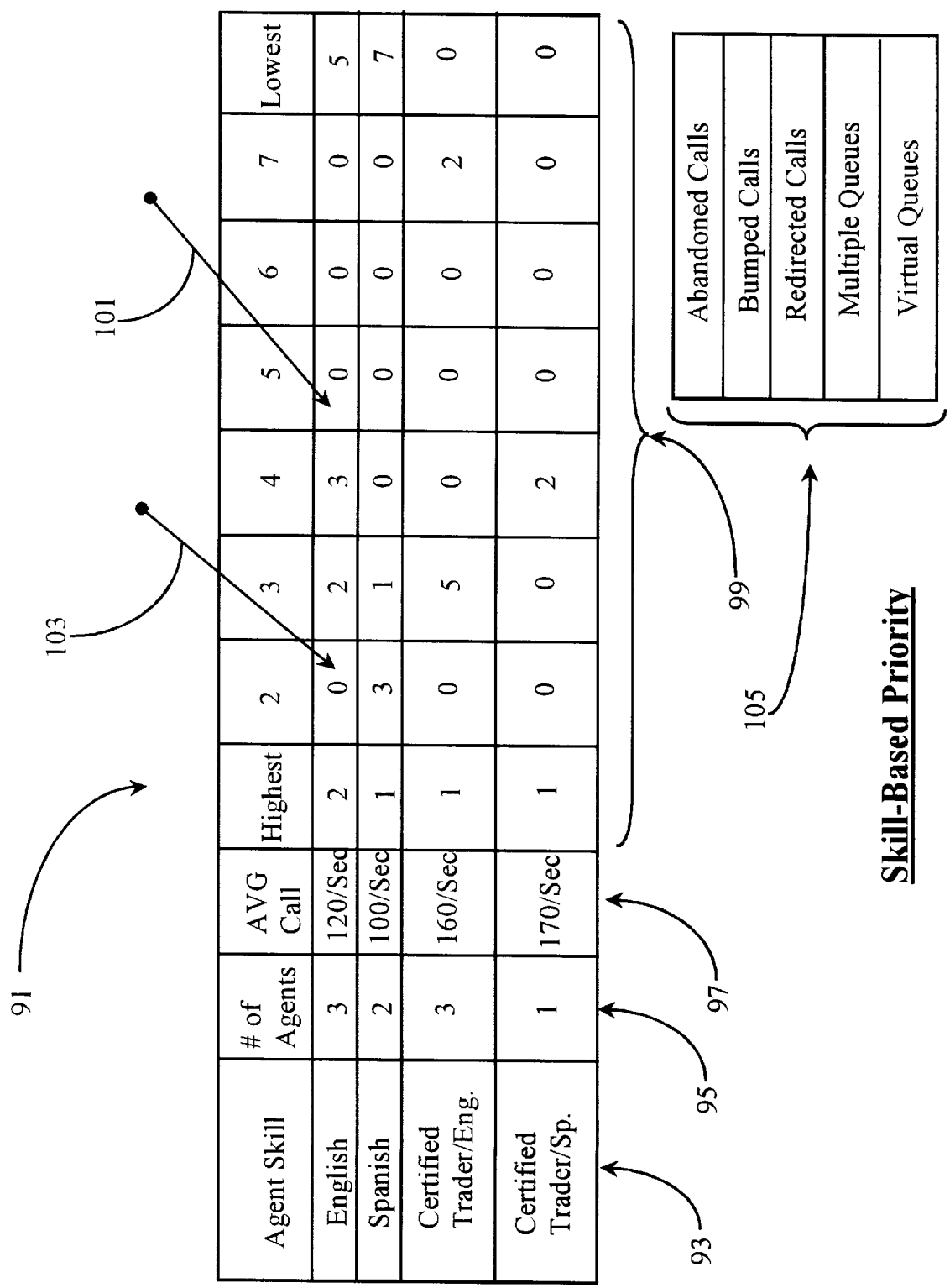
FIG. 3 is a table illustrating practice of the present invention in a skill-based priority queue.

FIG. 3 shows a table 91 illustrating practice of the present invention in a skill-based priority queue. Table 91 is intended to represent an exemplary skill-based priority queue similar to one disclosed with reference to specification 09/024,825 listed in the Cross-Reference to Related Documents section. In table 91 there is a column 93 in which agent-skill levels are listed. For example, English represents agents whose skill set is limited to the fact that they speak English. Spanish represents agents whose skill set is limited to the fact that they speak Spanish. Certified Trader/Eng. represents qualified and licensed traders who speak English. Certified trader/SP. represents qualified and licensed traders who speak Spanish.

Column 95 headed by title-block "# of Agents" represents the numbers of individual agents working at the skill levels illustrated in column 93. For example, there are 3 agents who are not certified traders who speak English and are assigned to answering calls from the queue. There are 2 Spanish speaking agents who are not certified traders answering calls from the queue. There are 3 certified traders who speak English and 1 certified trader who speaks Spanish answering calls from the queue. In this exemplary embodiment, there are a total of 9 agents assigned to answering calls from the queue. There is no duplication in the "number of agents" column.

A column 97 lists average call handling times for agents in each skill category under title-block "Avg. Call". For example the 3 English speaking agents who are not certified traders illustrated at the top left of table 91 have a combined call-disposal-time (CDT) of 120 seconds. This means that a call answered by one of these agents takes, on average, 120 seconds to dispose of from point of answer to point of termination. Likewise, Spanish speaking agents are averaging 100 seconds per call, certified traders speaking English are averaging 160 seconds per call, and certified traders who speak Spanish are averaging 170 seconds per call.

The above CDT figures are real-time numbers based on statistical reporting provided by Stat-server software as part of software 89 of FIG. 2. In a preferred embodiment, CDT averages take into account the rate of abandoned calls occurring within the queue and the amounts of time an agent may spend taking calls from another queue if there is more than one queue. These factors are randomly occurring events and are therefore impossible to account for when using the basic formula as described above.

An information table 105 lists some additional factors which can effect an EWT determination for an incoming call. These are abandoned calls (described above), bumped calls (priority queue), re-directed calls (error routed or transferred), use of multiple queues, and use of virtual queues.

Calls are stacked in queue according to priority and skill requirement of a caller. For example, in the column under title-block "Highest", the calls having the highest priority are listed according to skill requirement. To the right, columns labeled 2–7 and "lowest" reflect incremental lower levels of call priority with actual calls waiting listed according to skill requirement. For example, the lowest priority column has 5 calls listed and waiting for English speaking non-certified agents. There are 7 calls ahead of the 5 lowest priority calls. These are 3 calls in the fourth priority column, 2 calls in the third priority column, and 2 calls in the highest priority column. In this embodiment, calls having a same priority assignment in queue are answered according to FIFO rules, however a new call assigned a higher priority would be placed ahead of any lower priority calls in queue and behind any higher priority calls.

In this exemplary embodiment, a new call represented by vector 101 arrives and is assigned $5^{th}$ priority in the queue and requires an English speaking agent who does not have to be a certified trader. There are 7 calls ahead of call 101. Assuming then that another new call represented via a vector 103 arrives after call 101 and is assigned a $2^{nd}$ priority wherein an English speaking non-certified agent is required, the number of calls ahead with regards to call 101 increases by one. This assumes of course that all 3 English speaking agents are currently engaged with calls in the interim.

One with skill in the art may judge, from the preceding example, the difficulty of providing a reasonably accurate EWT relative to call 101 as higher priority calls may arrive and be placed in front in queue. Therefore, a periodic calculation is performed and caller 101 is periodically informed via IVR of any further delays, and perhaps given an option of increasing his priority or being transferred to another agent or queue.

By taking the basic prior art formula reproduced again below we can modify for different situations illustrated in information block 105 and described above.

$$EWT=(N \times T^h)/m \text{(basic formula)}. \qquad \text{I.}$$

To account for a multiple queue factor in basic FIFO queuing wherein agents only spend a fraction of their time answering from any one queue, the basic formula is modified as follows:

II.

$$EWT = (N \times T_h) \Big/ \sum_{i=1}^{i=m} a_i$$

In this notation, a fraction ai represents the fraction of time an agent spends answering calls from a single queue i. These fractions (may vary with each agent) must be summed up over all of the agents answering calls from the queue. This result represents the effective number of agents for the calculations used as m in equation I.

When taking into account an abandoned call factor which is a random factor of EWT itself, the above notation is multiplied by the percentage of calls that are not expected to be abandoned as follows:

III $$EWT = ((1 - r_a)(N \times T_h)) \Big/ \sum_{i=1}^{i=m} a_i$$

In this equation, ra is the rate of abandoned calls, so (1−ra.) is the rate of not-abandoned calls. This rate is computed as a dynamically self adjusting factor which takes into account historical information on abandoned calls obtained from Stat-server statistics. It will be apparent to one skilled in the art of statistical calculation that the accuracy of this statistic will improve as more information on call behavior becomes available. This is but one example of how separate gathering of information by Stat-server software of software 89 of FIG. 2 is superior to prior art methods.

With the power of compiling statistical information concerning call behavior such as CDT, rate of abandoned calls, rate of calls bumped, swapped or redirected calls, and so on, a certain confidence level regarding the accuracy of these figures may be developed through further calculation. These calculations are, in a preferred embodiment, performed via EWT software in conjunction with Stat-server software of software 89 of FIG. 2.

In some systems callers are informed of the EWT for their call on a periodic basis while waiting in queue. In the case of a simple FIFO queue wherein no priority or other intelligent routines are employed, informing a caller of the EWT may be performed once at the beginning of his wait. One will appreciate, however, that in more complicated queue situations such as illustrated via table 91, wherein priority routing and the like is performed, a caller will appreciate being informed of any significant deviations of the original EWT as given at the beginning of his wait.

Statistical information and calculated results will, of course, be more accurate during peak periods when a high number of calls are being processed. Therefore, the method of the present invention is more reliable during periods of greater need. Callers during low-flow periods are usually handled expediently with much less time waiting in a queue. In one embodiment, a call threshold may be established in a queue so that callers waiting over a pre-set limit will be informed of an EWT in queue while callers expected to be disposed of before the pre-set threshold will not.

Taking a simple example such as provided herein with introduced call 101, EWT for caller 101 will be 2+2+3 (calls in a higher priority) ×120 seconds (average CDT) divided by 3 (number of working agents). If caller 103 were introduced immediately thereafter before agents dispose of their current calls, then EWT for caller 101 would increase because of addition of call 103 which will be answered before call 101 because of priority. In this case, call 101 is bumped via call 103.

In some embodiments virtual queues are composed as a product of varying routing strategies employed within a communication center such as center 51 of FIG. 2. Virtual queues are often temporary, changing with differing routing routines employed. In a virtual queue, a call is represented by a token and the caller may hang-up and receive a call back when his or her call is next to be answered. More description regarding a virtual queue is provided with regard to co-pending patent application Ser. No. 09/024,825. The methods of the present invention may be employed with virtual queues with a high degree of success as long as the designer of the routing strategy provides meaningful objects from which statistics will be measured. Because of the integrative nature of components of software 89 of FIG. 2 namely, EWT, Stat-server, and T-server implementations, new routing strategies employing virtual queues may selectively obtain historical statistics related to the behavior of specific types of calls that may be generic to the new strategy.

Predicting Optimum Out-Bound Call Generation

As described in the background section, treating calls resulting from an out-bound campaign should be dynamically different from treating normal inbound calls because of a basic fact that in the case of outbound calls, customers will not likely accept significant wait periods in queue. The inventor provides a method for determining optimum frequency for outbound call generation that meets the following two conditions. One is that agents should not be underutilized. The other is that the rate of call abandonment in queue should be less than an acceptable maximum.

Figure 4:
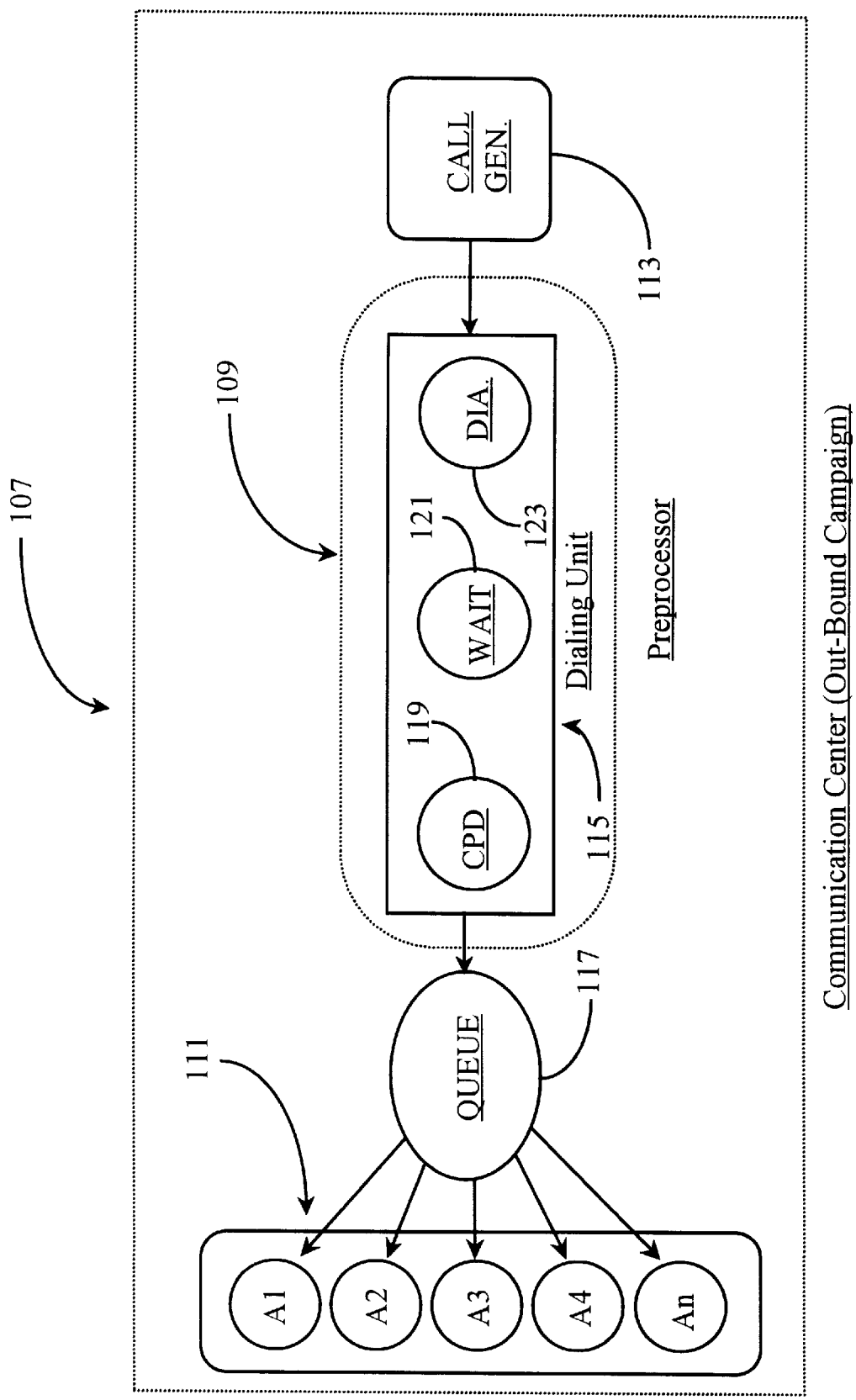
FIG. 4 is a block diagram illustrating out-bound call processing system as known to the inventor.

FIG. 4 is a block diagram illustrating out-bound call processing as known to the inventor. A communication center 107 is adapted for initiating out-bound call campaigns and routing connected calls as incoming events to available agents. Center 107 may be assumed to be analogous to center 51 of FIG. 2 above in terms of equipment and functionality. However, the description of this embodiment will focus on the aspect of an out-bound customer-care campaign launched from within the center.

Equipment and entities illustrated as participating in an outbound campaign include an outbound call generator 113, an outbound call preprocessor 109, a queue system 117, and a bank of agents 111. Call generator 113 is adapted to generate telephone numbers according to a pre-defined frequency to preprocessor 109. Generator 113 is hardware-enabled in this embodiment and has a programming feature that allows human and/or system programming functions to be employed therein for the purpose of managing function.

Preprocessor 109 further comprises a dialing unit 115 adapted for dialing customers having the telephone numbers fed thereto by generator 113 and for analyzing call status and progress for each call processed. For example, an outbound dialer 123 is provided and adapted to automatically dial each telephone number fed to it by generator 113 according to a pre-set frequency.

A waiting function 121 is provided and adapted to wait a pre-set time period for an answer to a call-in-progress (CIP). A suitable time may be set at four ringing events (exemplary). If a CIP is not answered within a suitable time period, then that call is released. However, if a CIP is answered, then that call progresses to a call-progress-determination (CPD) function 119. CPD 119 is provided and adapted to determine whether the call-answering party is live or machine. If a CIP is answered by a machine, then that call is released. If a CIP is answered by a live person, then that call progresses to an agent queue illustrated herein as a queue 117.

Agent bank 111 is further defined by the illustration of agents A1–An. Agents A1–An, in this example, are working from queue 117. Directional arrows illustrated between generator 113 and preprocessor 109, between preprocessor 109 and queue 117, and between queue 117 and agents A1–AN illustrate direction of call flow.

In a preferred embodiment, queue 117 is a first-in-first-out (FIFO) queue. However, in alternative embodiments more advanced queuing techniques may be employed. The inventor chooses a FIFO queue in this embodiment because of a presumption that customers called during an outbound campaign will not accept any significant wait periods in queue 117. Only calls answered by a live person are queued in this example. Moreover, IVR functionality may be assumed to be present in this example though none is illustrated.

The outbound system described above is enhanced by availability of statistical and actual communication-center information provided by virtue of state monitoring and compilation of data performed by an instance of STAT server previously described in disclosure pertaining to cross referenced Ser. No. 09/209,306. Therefore, the present invention seeks to incorporate a number of differing variables and constraints, determined through historical and real-time analysis, into algorithmic function in order to obtain an optimum determination of call-generation frequency for an outbound campaign. These variables are described and illustrated below.

Figure 5:
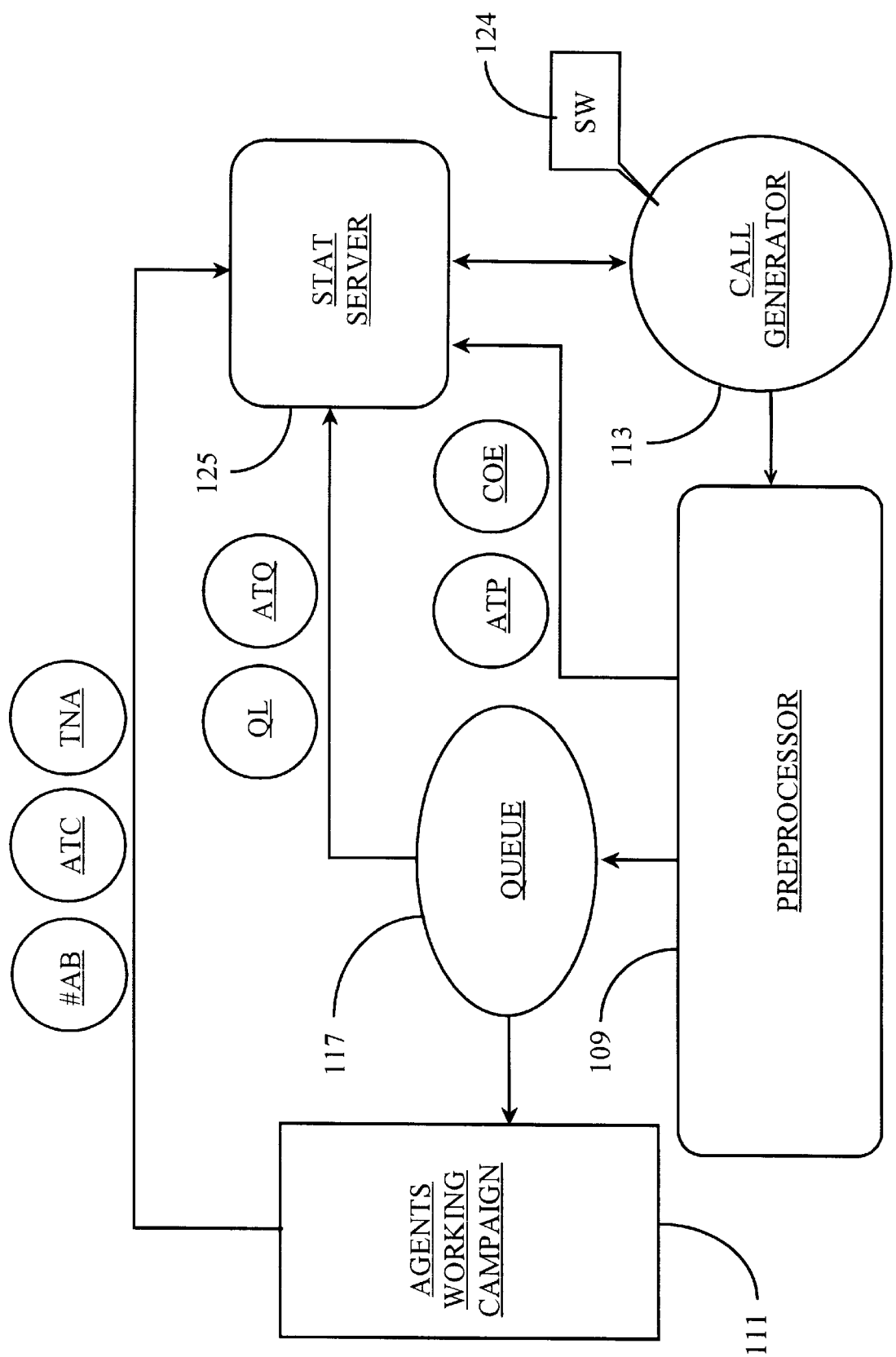
FIG. 5 is a block diagram illustrating variables considered in determining call-generation frequency according to an embodiment of the present invention.

FIG. 5 is a block diagram illustrating variables considered in determining call-generation frequency according to an embodiment of the present invention. This example diagram emulates the example of FIG. 4 above with the exception of the addition of a Stat-server 125 and related data flows. Therefore, elements that are present in this example and also in FIG. 4 retain the same element numbers given in FIG. 4.

In the outbound system described in FIG. 4, and also represented herein, generator 113 provides telephone numbers to preprocessor 109, which passes live connections to queue 117 subscribed to by agents 111 who are, in this example, dedicated to the outbound campaign. A directional CIP flow is illustrated by directional arrows placed between elements 113 and 109, elements 109 and 117, and between elements 117 and 111.

In a preferred embodiment of the present invention, call generator 113 is a hardware-enabled system that has constant access to information in Stat-server 125. An instance of SW 124 installed in generator 113 is provided and adapted to utilize any data obtained from Stat-server 125 and to perform algorithmic calculation such that an optimum call-generation frequency is maintained according to current conditions and facts existent within the parameters of the outbound campaign. Therefore, the actual frequency employed by generator 113 may change according to current conditions as they occur within the realm of the campaign. In one embodiment, SW 124 may be held in Stat-server 125 and adapted to control generator 113.

Stat-server 125 is adapted to receive data from each component participating in an outbound calling system. For example, a directional arrow leading from agent block 111 and progressing toward server 125 displays three illustrated data states. These are the number of agents who are busy with calls (#AB), the actual time each agent handles each call (ATC), and the total number of agents (TNA) dedicated to queue 117.

It is noted herein that the values described above will change during the course of a campaign and that changing one of these values may effect one or more of the other values. It is also noted herein that ATC includes long and short calls wherein short calls are defined as calls connected to an agent that result in immediate or near immediate hang-up by the customer. Long calls, then would be calls disposed of by discretion of an agent.

Stat-server 125 receives information from queue 117 as illustrated by a directional arrow leading from queue 117 and progressing toward server 125, showing also several values. One of these values is queue length (QL), defined as the number of calls waiting in queue at any given time. The other value illustrated is actual time in queue (ATQ) per call. ATQ refers to calls that leave queue 117 without being served by an agent.

A directional arrow illustrated as leading from preprocessor 109 and progressing toward server 125 represents data reported to server 125 by processor 109. One illustrated value is actual time each call is in preprocessor 109 (ATP). Another is data concerning the capacity of elements (COE) in preprocessor 109. The inventor intends that this example represent just some of the information categories that may be compiled by Stat-server 125 during monitoring of components 109–113. However, there are many other data categories and sub-categories that may be considered by the system of the present invention. Some additional categories that are not illustrated herein may include, but are not limited to, total number of calls in preprocessor, total rate of calls abandoned in preprocessor, rate of calls determined busy in preprocessor, and so on. The invention seeks to utilize key data values in order to develop a flexible method for determining an optimum frequency for call generation as is illustrated further below.

There are two methods that may be used to predict an optimum call-generation frequency for an outbound campaign given a set of variables and conditions. One is by using an analytical approach. The other method is practiced through simulation techniques (object modeling). Both methods are described below in this specification.

Analytical Approach

The main goal of applying an analitical approach for predicting call-generation frequencies is to estimate a dialing rate using rather simple formulas from classic queuing theory. It is known from queuing theory that $$p_k = \frac{a^k/k!}{\sum_{i=0}^{m} a^i/i!}, k = \overline{0, m}, \tag{1}$$

there exists a limit-probability distribution for the number of busy servers (agents).

This distribution is given from a well-known formula (illustrated above). The above formula is known from classical queuing theory developed by Erlang and is known in the art as Erlang's formula.

In the system described with reference to FIGS. 4 and 5, it is necessary to maintain a balance between input and output call flow of the system defined. The input flow of the system includes outbound and inbound call flows. That is, agents are answering both normal inbound calls and calls generated through outbound dialing (only outbound shown). While normal inbound traffic may only be observed, outbound call flow rate may be managed according to selected conditions. For given estimates of an inbound-call rate, agent utilization rate, and probability of successful connection between an agent and a customer, it is possible to calculate an optimum outbound call flow which is appropriate for a selected optimization goal.

Basic goals of the present invention are that all agents participating in an outbound campaign should be busy enough such that "agent utilization rate" should not be less than some pre-specified value defined herein as $\rho_{min}$. Further, that the rate of customers who have left the queue without being processed by an agent should be no higher than a specified value defined herein as $Ar_{max}$.

The outbound dialing system represented in FIG. 5 can be considered a classical queuing system. Assume here that m represents A1–An of element 11 of FIG. 5. A flow of outbound calls is considered an input "one" for the queuing system of FIG. 5. It is repeated that a main objective of the present invention is to obtain an outbound dialing rate under condition of over-dial (abandon rate) that in not greater than $Ar_{max}$, with a utilization rate no less than $\rho_{min}$. If $Ar_{max}$ is decreased, the value of $p_{min}$ should be also decreased. There is a functional one-to-one relationship between the parameters of the above-mentioned values. Therefore, if one of the values is held fixed, then the other value may be determined through calculation. Thus, the appropriate outbound dialing frequency (call generation frequency) relates (after calculation) to the value pair ($Ar_{max}$, $\rho_{min}$).

Referring back to FIG. 4, in order to determine the appropriate rate for call generation for generator 113, it is important to consider a mathematical model of the entire outbound dialing system. It is preferred, as previously described, that calls having progressed into queue 117 are those calls that have been answered by a live person and should not remain in queue 117 for any length of time. In actual practice, time in queue must be only a second or so. This time span is small enough to allow a mathematical representation of the system of FIG. 4 without a queue. For purpose of discussion then, all calls progressing to queue 117 are abandoned if all agents are busy with calls. It is of course assumed in this application that the outbound call flow exhibits stochastic characteristics.

It is important to note here that a solution to determining a proper call generation frequency for generator 13 is a predictive one. In observance of Erlang's formula, it is noted that $\rho_k$ is the probability that k servers (agents) are busy. In application of the basic formula (1) described above, consider that $\alpha=\lambda/\Phi$ where $\lambda$ is the average rate of the input call flow of the system and $\Phi$ is the average rate of the output flow. The present invention applies a solution under such condition as $\lambda=(n\ \Phi)<1$. Without the just-mentioned condition or constraint, input traffic would be more than output 1. In that case, call abandon rate would increase exponentially. It is also noted herein that Erlang's formula is applied for a queuing system in equilibrium. A prediction calculated here is based upon a state of equilibrium for this state of the queuing system.

The following formulations and text description are intended to show how Erlang's theory may be used to predict a call generation frequency for a basic outbound model (represented in FIGS. 4 and 5) where call flow is considered highly stochastic.

Optimizing Abandon Rate

Optimizing a call abandon rate to no more than the limit $Ar_{max}$ may be expressed as follows:

$$Pm(\alpha)=Ar_{max}. \quad (2)$$

The value Of $\rho_m$ depends on $\alpha$. For a given m we can calculate $\alpha$, expressed as $\alpha_m$, and satisfying the above equation. The input flow of the system consists of outbound and inbound call flows. The present invention seeks to manage the outbound flow rate only. The inbound call flow can be observed only. The value am can be represented as follows:

$$a_m = \frac{p\lambda_m + \lambda_i}{\phi}, \quad (3)$$

Where $\rho$=the probability of a successful outbound call and $\lambda_m$=the average rate of outbound call flow, and $\lambda_i$=the average rate of inbound call flow. The above equation provides an opportunity to calculate $\lambda_m$. This value will reveal the correct frequency for call generation observing the constraint $Ar_{max}$. Steps to solving the problem include:

1. Estimating values $\rho$, $\lambda_i$, and $\phi$. These values can be calculated using current data. The value of $\phi=1/t$, where t is the average duration of an answered call.
2. Obtaining the value $\alpha_m$ as a solution from equation (2) above with respect to $\alpha$.
3. Obtaining the value of $\lambda_m$ from equation (3) above wherein $\lambda_m=(\alpha_m\Phi-\lambda_i)/p$.

One with skill in the art of mathematical expression and functional notation will recognize the functionality provided by the above notations.

Optimizing Agent Utilization

Agent utilization or busy factor will be expressed as B. This value represents an average number of busy (engaged in active calls) agents in equilibrium using the model represented by FIGS. 4 and 5. Using Erlang's formula, B is expressed as follows:

$$B = B(a) = \sum_{k=1}^{m} k \frac{a^k/k!}{\sum_{i=0}^{m} a^i/i!} = \frac{aR(m-1, a)}{R(m, a)}, \quad (4)$$

where $$R(m, a) = \sum_{k=0}^{m} a^k/k!.$$

It is exemplified by the above formula that B is a function of $\alpha$. Here parameter a has the same mean as above ($\alpha=\lambda/\Phi$). In order to solve the problem for the given optimization goal it is necessary to find $\alpha_m$ as a solution of the following equation.

$$B(\alpha)=\rho_{min}. \quad (5)$$

The remaining computation steps for obtaining the value $\lambda_m$ are the same as described previously. It is known that the overdial rate (rate of abandon calls)=$\rho_m$. Therefore, after calculating the value of $\alpha_m$ from equation (5) it is possible to find the corresponding value of $\rho_m$ by using Erlang's formula.

It is noted herein that when the active number of participating servers or agents is very large, computational errors in calculating values of $p_m(\alpha)$ and $B(\alpha)$ may appear. In order to avoid rising computational errors when calculating the value of $p_m(\alpha)$ for a large number of agents (m), the following recursion formula is observed.

$$p_m(a) = \frac{ap_{m-1}}{m + ap_{m-1}}.$$

In order to improve calculating $B(\alpha)$ we write the formula for it as $$B(\alpha) = mp_m + (m-1)p_{m-1} + (m-2)p_{m-2} + \ldots + kp_k + \ldots + p_1. \quad (6)$$

In one embodiment, another approach may be used to reduce the computational errors stated above. This approximate integral approach is expressed as follows:

$$B(\alpha) = \alpha F(m-1, \alpha)/F(m, \alpha), \quad (7)$$

Where $F(x,\alpha)$ is a probability distribution function for normal random variables with a mathematical expectation a and a variance a. It is well known that $F(x,\alpha)$ may be expressed as follows:

$$F(x, a) = \frac{1}{\sqrt{2\pi a}} \int_{-\infty}^{x} e^{-(x-a)^2/(2a)} dz.$$

The formula (7) illustrated further above can be easily derived from the following facts. The Erlang's formula gives the probability distribution for Poisson random variable $\xi$ under condition $\xi \leq m$. If m is large enough, the value of am for a reasonable value of $Ar_{max}$ or $\rho_{min}$ is also large. Hence we can use the normal approximation for the Poisson distribution, which is well known in the art.

Simulation Modeling

In another aspect of the present invention, a simulation (object modeling) method is used to solve the call generation frequency problem while continuing to observe the stated optimization goals, which were described above.

In one aspect, a model represents a simplified scope of a whole outbound call-generation and service system. The same model equates to a strict and formal representation of the system. This fact allows formal treatments including logical reasoning about its properties and therefore about properties of the whole system. A simulation model of an outbound service campaign can be described in terms of queuing system theory. The basic components of a model for the purpose of the present invention are represented in FIG. 6.

Figure 6:
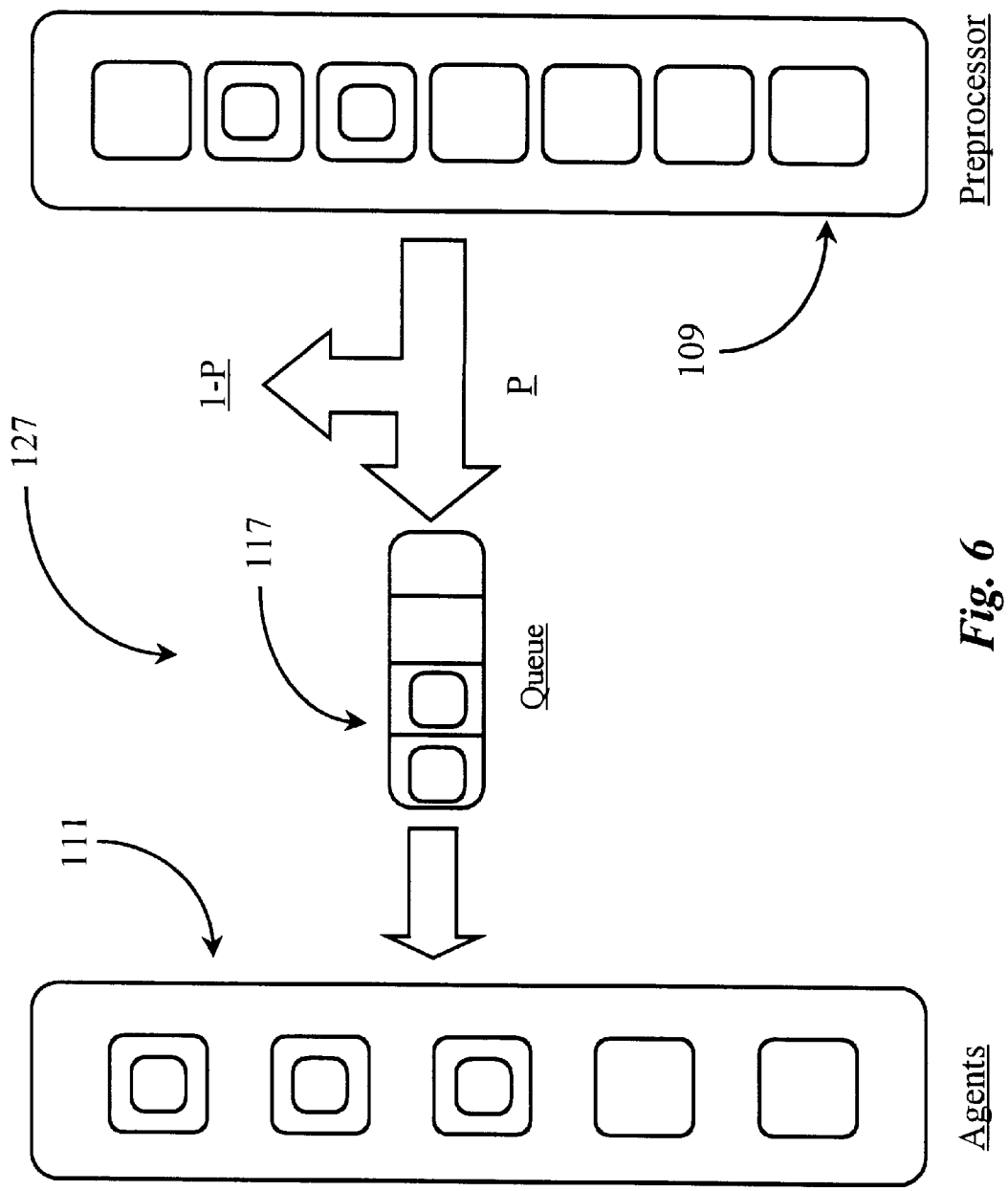
FIG. 6 is a block diagram of an outbound call-processing model according to an embodiment of the present invention.

FIG. 6 is a block diagram of an outbound call-processing model 127 according to an embodiment of the present invention. Model 127, in terms of queuing theory, comprises two nodes defined as sever centers that are connected sequentially. One node corresponds to agents (111), and the other node corresponds to a preprocessor (109). A call-waiting queue (117) is represented between nodes 111 and 109. A directional arrow indicates call flow from preprocessor 109 into queue 117. For example, the section of the arrow labeled P is the number of calls answered by a live person and therefore entering queue 117. The section labeled 1–P corresponds to the number of calls that were released before queue.

In this example, it is represented that there are two calls in preprocessor 109 (occupied boxes), two calls waiting in queue, and three calls being handled by agents. Note that there are two agents available for handling the calls waiting in queue 117. The following variables will be represented in example notation below.

$\tau_1$—the average time of processing long calls, $\tau_2$—the average time of processing short calls, $\rho_1$—the probability of long calls;

$\rho_2$—the probability of short calls;

M—the capacity of preprocessor, $T_p$—the delay in the preprocessor;

$\rho$—the probability that a call will reach a living customer and, therefore, will be placed to the queue;

$\mu$—the average time of waiting in a queue by customers before abandon m—the total number of agents;

$\rho P_{min}$—the minimal agents' utilization rate;

$Ar_{max}$—the maximal abandon rate.

P—agent utilization rate.

Ar—abandon rate.

The following assumptions are attributed to distribution function of model 127:

1) Agents' service times have exponential distribution with parameters $\tau_1$ and $\tau_2$:

$$f_1(t) = \begin{cases} \frac{1}{\tau_1} e^{-\frac{t}{\tau_1}}, & \text{if } t \geq 0; \\ 0, & \text{otherwise,} \end{cases} \quad \text{and} \quad (8)$$

$$f_2(t) = \begin{cases} \frac{1}{\tau_2} e^{-\frac{t}{\tau_2}}, & \text{if } t \geq 0; \\ 0, & \text{otherwise,} \end{cases}$$

2) A call abandonment process has an exponential distribution with parameter $\mu$:

3) The preprocessor delays calls relating to a deterministic delay process having a delay parameter $\tau_3$.

In defining a precise statement of the problem to be solved, consider that to is an initial moment of time. At this moment there exists a current number of busy agents $K_0$, a current queue length $Q_0$, and a current number of calls still in preprocess mode $P_0$. Also consider that for each call still at preprocessor (109), there is a rest time defined as the period of time that call remains in preprocessor (109) or $tr_i$ where $0 \leq i \leq P_0$. The solution is to calculate the appropriate time function $t1 \leq t0$ when a next call is to be generated while observing two requirements listed below.

1) the average abandon rate does not exceed some specified maximal rate: $-Ar \leq Ar_{max}$; and 2) the average agent utilization rate is not less then some specified minimal rate: $\rho \geq \rho_{min}$.

It should be noted here that in all types of queuing arrangements the following notation is valid.

$$Q \sim \frac{\rho}{1-\rho}, \quad (9)$$

Where Q is an average length of queue (117) and $\rho$ is the utilization rate of agents.

Figure 7:
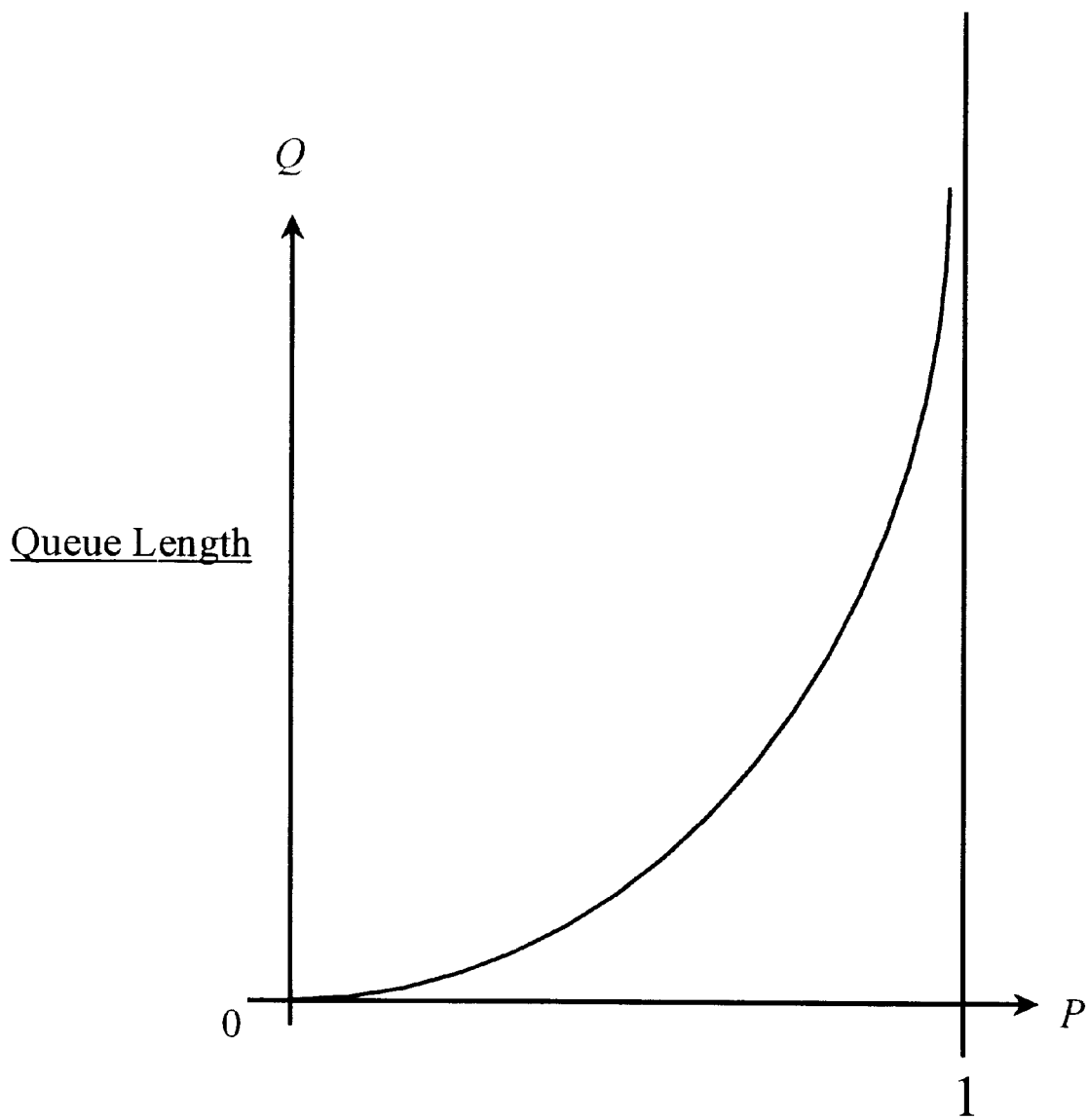
FIG. 7 is a graph representation of an exponential rate of call abandonment proportional to queue length.

FIG. 7 is a graph representation of an exponential rate of call abandonment proportional to queue length. In this example graph, which is labeled with the above-described values, it is noted that the number of abandoned calls (represented by curve) is proportional to the length of the associated queue. Therefore the relationship between Ar and ρ can be expressed in the following graph.

Figure 8:
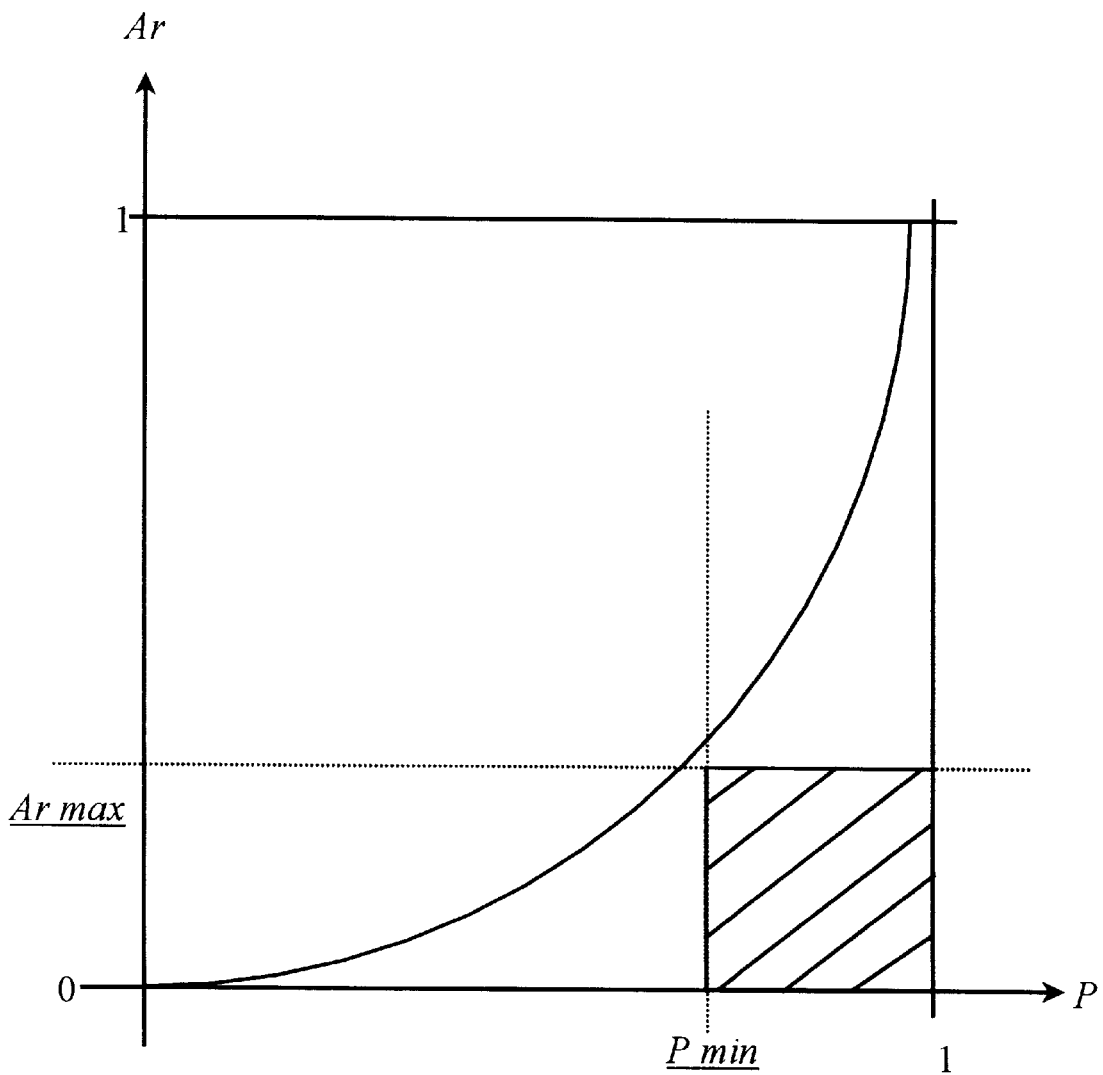
FIG. 8 is a graph representation illustrating a conditional relationship between $Ar_{max}$ and $p_{min}$.

FIG. 8 is a graph representation illustrating a conditional relationship between $Ar_{max}$ and $\rho_{min}$. The stated requirement, which is that the average $Ar \leq Ar_{max}$ and that the average $\rho \geq \rho_{min}$ is graphically represented by a sectioned square. In the graph, it is noted that the curve, representing abandoned calls, does not necessarily intersect the condition square. This state implies that there may be no way to fully satisfy all of the requirements in a stochastic call flow. Therefore, a more general approach must be employed with respect to simulation.

$$\Phi(Ar, \rho) \qquad (10)$$

The above function is optimized by observing two states:
1) Abandon rate (Ar) should be maintained at admissible level while maximizing agent utilization rate (ρ) is as much as possible.
2) Agent utilization rate (ρ) is maintained at an acceptable level while abandonment ratio is held as small as possible.

In creation of a simulation with respect to agent parameters, a mathematical starting point is observed for both queue length and for the number of busy agents. The first formula is closely related to a call abandon rate and the second formula is related to agent utilization. The process defining the length of a queue has the following form:

$$Q_t = Q_0 + \int_0^t I\{K_s = m\} dN_s - D_t - S_t, \qquad (11)$$

Where Q0 is a queue length at an initial moment of time; Control process N effects a jump at moment of entry of a next call entering queue from a preprocessor. xxx An additional formula Dt=tR0__Qsds represents an abandonment of a client while in queue without benefit of agent service. An additional formula St=tR0mI f Qs>0 g $(p1_{13}$ 1+p2__2)ds describes total agent processing of the calls. Here I fxg is an indication function with I fxg=1 when x is true and I f xg=0 if x is false.

The process describing the number of busy agents has the following form:

$$K_t = K_0 + \int_0^t I\{Q_s = 0, 0 \leq K_s \leq m\} dN_s - \qquad (12)$$
$$\int_0^t I\{Q_s = 0, 0 < K_s \leq m\} K_s \left(\frac{p_1}{\tau_1} + \frac{p_2}{\tau_2}\right) ds.$$

Where K0 is a number of busy agents at the initial moment of time; The second term in the equation corresponds to arriving calls from the preprocessor and delivering directly to available agent (i.e. queue is empty); The third term corresponds to freeing agents after finishing call processing (long or short) provided that queue is empty (agent will not be captured by next call).

The above-listed formulas (11 and 12) may be transformed into the $$Q_t = Q_0 - D_t - S_t, \qquad (13)$$

$$K_t = K_0 - \int_0^t I\{Q_s = 0, 0 \leq K_s \leq m\} K_s \left(\frac{p_1}{\tau_1} + \frac{p_2}{\tau_2}\right) ds. \qquad (14)$$

following formulas when considering simulation without a queue (optimum):

A formula is derived for expressing abandon rate Ar. Abandon rate is defined as a ratio of abandoned calls to all calls left in queue during some time interval and before agent processing. Clearly $0 \leq Ar \leq 1$. $Q_1 - Q_0 = \Delta Q$ or the noted change in a queue during time interval $\Delta T$, which=$t_1 - t_0$. ΔQD is a number of calls left in a queue due to abandonment during ΔT Then formula for the average abandon rate during the interval ΔT can be expressed as follows:

$$\overline{Ar} = \frac{\Delta Q_D}{\Delta Q} \qquad (15)$$

To calculate the average agent utilization rate ρ at the interval ΔT we will use the formula:

$$\overline{Ar} = \frac{\Delta Q_D}{\Delta Q} \qquad (15)$$

Where $K_i$ is the average number of busy agents at the interval $\Delta t_i = t_i + 1 - t_i$ and n is a number of intervals $\Delta t_i$ within the intervals ΔT.

The actual simulation programming language is not detailed herein as one with skill in the art will recognize and appreciate the process of simulation based on queuing theory. In a preferred embodiment C++ programming language is used.

The novel portion of the programming method is that it takes into account the conditions that were mentioned further above in this specification by simulating each of the processes and allowing a prediction of an optimum frequency for call-generation based on past experience and real time data and conditions. Through empirical method many separate simulations may be performed according to varying conditions and states allowing for accurate predictions, which may be timed and executed such that optimum agent utilization rates and call abandonment rates are realized in virtually any outbound campaign.

It will be apparent to one with skill in the art that the method and apparatus of the present invention will work with any type of queue without departing from the spirit and scope of the present invention such as with above mentioned types. It will also be apparent to one with skill in the art that the present invention may be practiced at network level at such switches that may be connected to a CTI processor of the invention such as processor 57 of FIG. 2. Practice of the present invention with respect to IPNT telephony is also possible and contemplated. Therefore, the present invention should be afforded the broadest scope according to the disclosure. The spirit and scope of the present invention is limited only by the claims that follow.

What is claimed is:

1. A system for balancing outbound dialing rate with agent utilization in a telephony call center, minimizing wait time for answered outdialed calls, comprising:

a call number generating module for generating numbers to be automatically dialed;

a dialing unit for dialing numbers generated;

a queue for queing answered calls; and a stat module for monitoring performance and generating a call generation rate;

characterized in that the system uses a simulation method for determining the call generation rate, wherein parameters relating to a queing system are estimated in absence of sufficient information by simulating each of the system's processes, predicting behavior of the system on basis of previous experience, and finding optimal point in future to make a next call.

2. A simulation method for minimizing time in queue for parties answering outdialed calls, in an outdialing system comprising steps of:

(a) simulating each of the system's processes;

(b) estimating parameters related to the system in absence of sufficient information based on step (a);

(c) predicting behavior of the system on basis of previous experience; and (d) finding an optimal point in the future to make a next call, based on results of steps (a)–(c).

* * * * *

UNITED STATES PATENT AND TRADEMARK OFFICE
CERTIFICATE OF CORRECTION

PATENT NO. : 6,449,358 B1 Page 1 of 1
DATED : September 10, 2002
INVENTOR(S) : Anisimov et al.

It is certified that error appears in the above-identified patent and that said Letters Patent is hereby corrected as shown below:

<u>Title page,</u>
Item [75], Inventor, now reads: " Nikolay Anisimov, Walnut Creek;
Konstatin Kishinsky, San Carlos;
Niolay Korolev, Walnut Creek;
Gregory Pogossiants, Palo Alto;
Yuri Shtivelman; Vadim Zyarko, both of
San Francisco, all of CA (US)"

Should read: -- Nikolay Anisimov, Walnut Creek;
Konstatin Kishinsky, San Carlos;
Nikolay Korolev, Walnut Creek;
Gregory Pogossiants, Palo Alto;
Yuri Shtivelman; Vadim Zyarko, both of
San Francisco, all of CA (US) --

Signed and Sealed this

Tenth Day of December, 2002

JAMES E. ROGAN
*Director of the United States Patent and Trademark Office*